(12) United States Patent
Sugimoto

(10) Patent No.: US 7,565,043 B2
(45) Date of Patent: Jul. 21, 2009

(54) OPTICAL MODULE

(75) Inventor: Takara Sugimoto, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 11/651,026

(22) Filed: Jan. 9, 2007

(65) Prior Publication Data

US 2007/0189660 A1 Aug. 16, 2007

(30) Foreign Application Priority Data

Jan. 12, 2006 (JP) ............................. 2006-004693

(51) Int. Cl.
*G02B 6/12* (2006.01)
*G02B 6/26* (2006.01)

(52) U.S. Cl. .......................................... 385/14; 385/31
(58) Field of Classification Search .................... 384/14, 384/31
See application file for complete search history.

(56) References Cited

U.S. PATENT DOCUMENTS

| | | | | |
|---|---|---|---|---|
| 5,764,832 | A | * | 6/1998 | Tabuchi ......................... 385/49 |
| 6,567,590 | B1 | * | 5/2003 | Okada et al. .................... 385/49 |
| 6,853,776 | B2 | * | 2/2005 | Kimura ........................... 385/47 |
| 2002/0001427 | A1 | * | 1/2002 | Hashimoto et al. ............. 385/14 |
| 2002/0031307 | A1 | * | 3/2002 | Kimura ........................... 385/49 |
| 2002/0048431 | A1 | * | 4/2002 | Kimura ........................... 385/47 |
| 2002/0051303 | A1 | * | 5/2002 | Smaglinski ..................... 359/728 |
| 2002/0080457 | A1 | * | 6/2002 | Nakanishi et al. .............. 359/189 |
| 2002/0097962 | A1 | * | 7/2002 | Yoshimura et al. ............. 385/50 |

FOREIGN PATENT DOCUMENTS

| | | | |
|---|---|---|---|
| JP | 10-253848 | | 9/1998 |
| JP | 11237529 | A * | 8/1999 |
| JP | 2002090560 | A * | 3/2002 |
| JP | 2005-91460 | | 4/2005 |

* cited by examiner

*Primary Examiner*—K. Cyrus Kianni
(74) *Attorney, Agent, or Firm*—Young & Thompson

(57) ABSTRACT

An optical module outputting transmitted optical signals from a light-emitting element to an optical fiber and guiding received optical signals arriving from the same optical fiber to a light-receiving element prevents transmitted optical signals originating from the light-emitting element of a local station from coupling to the light-receiving element, devolving into noise and impeding communication. Light-emitting element and light-receiving element are arranged in a positional relationship, whereby the optical axis of light-emitting element and the normal to light-receiving surface of light-receiving element are located in a spatially divergent relationship. Furthermore, it comprises optical path conversion elements which, along with guiding optical signals propagating along receiving optical waveguide to light-receiving surface of light-receiving element, ensures that the image of the light-emitting spot of light-emitting element projected onto a plane including light-receiving surface of light-receiving element does not overlap with light-receiving surface of light-receiving element.

17 Claims, 9 Drawing Sheets

OPTICAL MODULE

BACKGROUND OF THE INVENTION

1. Field of the Invention

The present invention relates to a device for carrying out optical communication via optical fibers. In particular, the present invention relates to an optical module for carrying out bidirectional transmission and reception of optical signals over a single optical fiber.

2. Description of Related Art

The development of communication technologies in recent years has resulted in the implementation of single-fiber bidirectional optical modules used for carrying out transmission and reception of optical signals over a single optical fiber. Small-sized, high-speed, inexpensive optical modules are in particular demand for "Fiber-to-the-home" (FTTH), in which household-oriented data communication services are provided by running fiber-optics to individual homes.

FIG. 16 explains the configuration of a conventional bidirectional optical module. The optical module utilizes a waveguide type optical wavelength multiplexer/de-multiplexer, such as the one disclosed in JP H10-253848A, and has a configuration comprising: optical waveguide substrate 101 provided with transmitting optical waveguide 301 and transceiving optical waveguide 303 intersecting in a V-shape at one end; light-emitting element 201 provided at the other end of transmitting optical waveguide 301, i.e. at the tip of a prong of the V-shape; light-receiving element 202 provided at the intersection point of the V-shape; and optical filter 203 attached to optical waveguide substrate 101 between optical waveguide substrate 101 and light-receiving element 202, with optical fiber 200 secured to the tip of a prong of the V-shape of transmitting waveguide 301.

A received optical signal coming in from optical fiber 200 propagates along transceiving optical waveguide 303, passes through optical filter 203, impinges on light-receiving element 202, and is converted into an electric signal. On the other hand, a transmitted signal is converted into a transmitted optical signal by light-emitting element 201, coupled to transmitting optical waveguide 301, reflected by optical filter 203, caused to propagate along transceiving optical waveguide 303, and emitted into optical fiber 200. This makes it possible to perform transmission and reception of optical signals over a single optical fiber 200.

However, in the conventional optical module illustrated in FIG. 16, the transmitted optical signal, i.e. light that is emitted from light-emitting element 201 and is not coupled to transmitting optical waveguide 301, is scattered inside optical waveguide substrate 101 as stray light. When it is incident on light-receiving element 202, the stray light devolves into noise on top of the original received optical signal and impedes communication.

Furthermore, since the configuration of light-receiving element 202 is intended for direct reception of optical signals emitted from the end face of transceiving optical waveguide 303, it has to be provided separately from optical waveguide substrate 101, which creates problems in terms of increased cost and limitations on miniaturization.

FIG. 17 explains another conventional configuration, wherein the above-mentioned noise is reduced. In this conventional example, which is disclosed in JP 2005-091460A, slit 304 is formed obliquely to the normal to optical waveguide substrate 101 within transceiving optical waveguide 303, and optical filter 203 is inserted therein. Light-emitting element 201 is mounted above transceiving optical waveguide 303 such that transmitted optical signal 501 is coupled to transceiving optical waveguide 303 through optical filter 203. On the other hand, light-receiving element 202 is mounted so as to couple at the end of transceiving optical waveguide 303.

According to JP 2005-091460A, the fact that the light-receiving surface of light-receiving element 202 faces away from the light-emitting surface of light-emitting element 201 permits a reduction in noise. However, when the optical axis of the light-emitting element and the normal to the light-receiving surface of light-receiving element 202 intersect, especially when light-emitting element 201 and light-receiving element 202 are arranged in close proximity due to module miniaturization, a portion of transmitted optical signal 501 from light-emitting element 201 becomes incident on the light-receiving element directly and noise cannot be sufficiently suppressed.

Furthermore, the configuration of the module disclosed in JP 2005-091460A, in which transmitted optical signals 501 emitted from light-emitting element 201 are reflected by optical filter 203 and coupled to transceiving optical waveguide 303, places considerable limitations on the size and arrangement of light-emitting element 201, light-receiving element 202, and optical filter 203, and is inadequate in terms of productivity and miniaturization.

SUMMARY OF THE INVENTION

It is an object of the present invention to provide an optical module capable of preventing transmitted optical signals from the light-emitting element of a local station from coupling to the light-receiving element, devolving into noise, and impeding communication. Furthermore, it is an object of the present invention to provide a compact optical module that makes it possible to mount a light-emitting element, a light-receiving element, etc. on a single substrate and permits inexpensive high-speed operation.

A first aspect of the present invention provides an optical module comprising, on the same optical waveguide substrate, a first optical waveguide having transmitted optical signals from a light-emitting element incident thereon and a second optical waveguide guiding received optical signals to a light-receiving element, wherein the optical module comprises optical path conversion means that converts the direction of propagation of optical signals propagating along the second optical waveguide to a first direction spatially divergent from the axis of incidence of the transmitted optical signals going into the first optical waveguide, and guides light arriving from directions different from that of the second optical waveguide in a direction different from the first direction.

A second aspect of the present invention provides an optical module comprising, on the same optical waveguide substrate, a light-emitting element, a first optical waveguide optically coupled to the light-emitting element, a light-receiving element, and a second optical waveguide guiding optical signals to the light-receiving element, wherein the light-receiving element is arranged in a position where the normal to its light-receiving surface is in a spatially divergent relationship with respect to the axis of incidence of optical signals on the first optical waveguide from the light-emitting element and comprises optical path conversion means that guides optical signals propagating along the second optical waveguide to the light-receiving surface of the light-receiving element, and ensures that an image of the light-emitting spot of the light-emitting element projected onto a plane comprising the light-receiving surface of the light-receiving element does not overlap with the light-receiving surface of the light-receiving element.

The optical path conversion means may include means for performing optical path conversion using planar reflectors, concave reflectors, or differences in the refractive indices of materials. When refractive index differences are utilized, the optical path conversion means may be formed integrally with the light-receiving element.

Furthermore, a third optical waveguide with an optical fiber optically coupled thereto and optical multiplexing/de-multiplexing means outputting transmitted optical signals from the first optical waveguide to the third optical waveguide and guiding received optical signals from the third optical waveguide to the second optical waveguide are preferably formed on the optical waveguide substrate. The optical multiplexing/de-multiplexing means can include a slit formed in the optical waveguide substrate and an optical filter that is inserted in the slit, couples transmitted optical signals from the first optical waveguide to the third optical waveguide by passing or reflecting the transmitted optical signals, and couples received optical signals from the third optical waveguide to the second optical waveguide by reflecting or passing the received optical signals.

The portion of the light emitted from the light-emitting element that does not get coupled to the optical waveguide turns into stray light. The present invention makes it possible to prevent the stray light from directly reaching the light-receiving surface of the light-receiving element because the normal to the light-receiving surface of the light-receiving element is arranged in a spatially divergent relationship with respect to the axis of incidence (hereinafter called simply "the optical axis of the light-emitting element") of optical signals introduced into the optical waveguide from the light-emitting element. In addition, errors due to interference from signals emitted by the local station can be greatly reduced because the optical path conversion means couples only received optical signals to the light-receiving surface of the light-receiving element and stray light cannot reach the light-receiving surface of the light-receiving element.

BRIEF DESCRIPTION OF THE DRAWINGS

Specific embodiments of the present invention will now be described, by way of example only, with reference to the accompanying drawings in which.

DETAILED DESCRIPTION OF THE PREFERRED EMBODIMENTS

Figure 1:
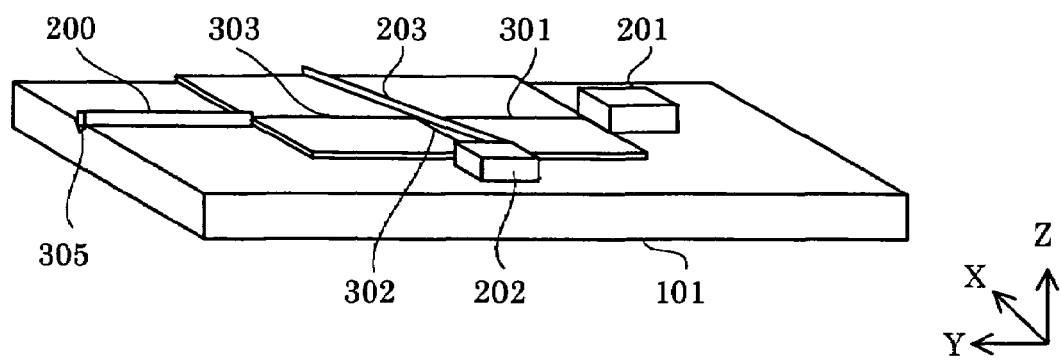
FIG. 1 is a perspective view illustrating the configuration of an optical module used in a first embodiment of the present invention.
Figure 2:
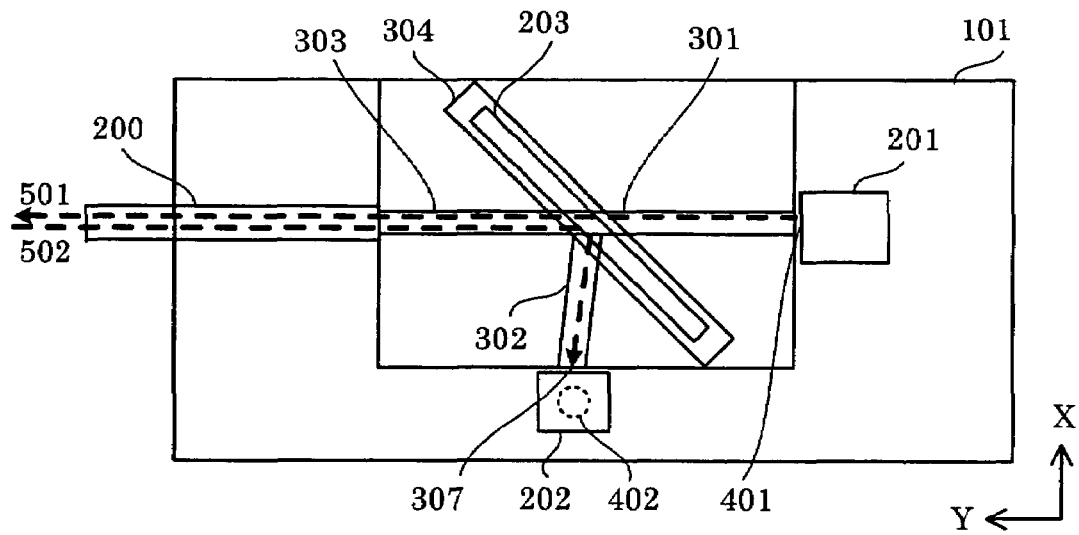
FIG. 2 is a plan view illustrating the configuration of the optical module used in the first embodiment of the present invention.
Figure 3:
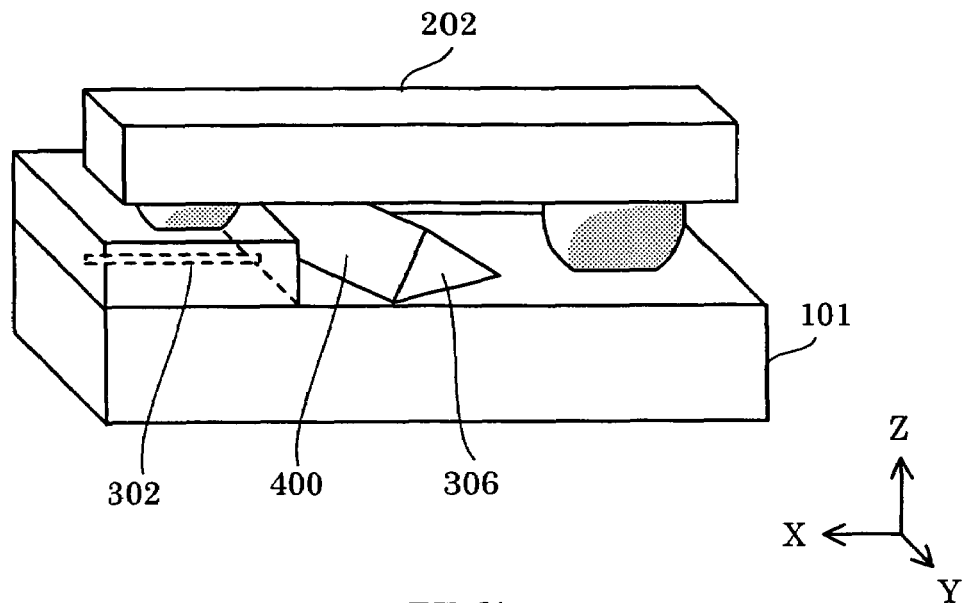
FIG. 3 is an enlarged view of the vicinity of the light-receiving element of the optical module used in the first embodiment of the present invention.
Figure 4:
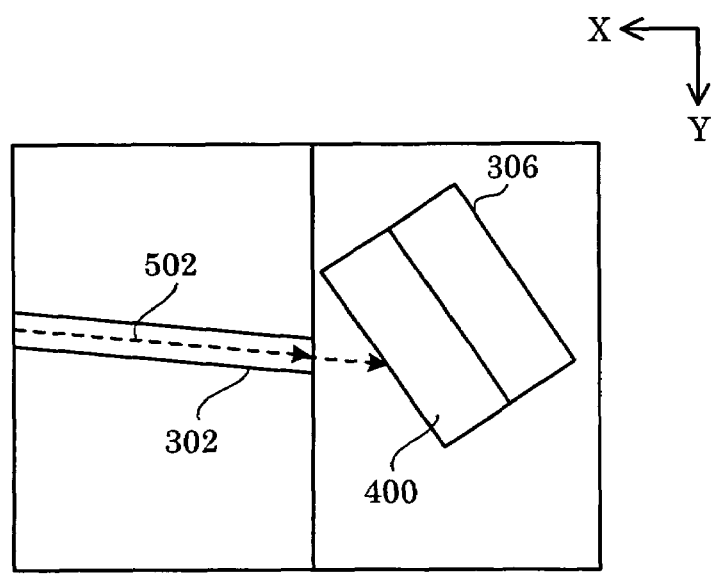
FIG. 4 is a plan view of the vicinity of the optical module used in the first embodiment of the present invention without the light-receiving element.

FIG. 1 through FIG. 4 illustrate the configuration of an optical module used in a first embodiment of the present invention, with FIG. 1 showing a perspective view, FIG. 2 a plan view, FIG. 3 an enlarged view of the vicinity of the light-receiving element, and FIG. 4 a plan view of the vicinity of said portion without the light-receiving element.

The optical module comprises light-emitting element 201, transmitting optical waveguide 301 optically coupled to light-emitting element 201, light-receiving element 202, and receiving optical waveguide 302 guiding optical signals to light-receiving element 202, all of which are located on optical waveguide substrate 101, and furthermore, comprises transceiving optical waveguide 303 with optical fiber 200 optically coupled thereto and, as optical multiplexing/de-multiplexing means for outputting transmitted optical signals from transmitting optical waveguide 301 to transceiving optical waveguide 303 and guiding received optical signals coming in from transceiving optical waveguide 303 to receiving optical waveguide 302, comprises slit 304 formed in optical waveguide substrate 101 and optical filter 203, which is inserted in slit 304, couples transmitted optical signals from transmitting optical waveguide 301 to transceiving optical waveguide 303 by passing the transmitted optical signals, and couples received optical signals coming in from transceiving optical waveguide 303 to receiving optical waveguide 302 by reflecting the received optical signals.

This embodiment is characterized in that light-receiving element 202 is arranged in a position where the normal to its light-receiving surface 402 is in a spatially divergent relationship with respect to the optical axis of light-emitting element 201 and comprises optical path converter 306 (see FIG. 3 and FIG. 4) which, along with guiding optical signals propagating along receiving optical waveguide 302 to light-receiving surface 402 of light-receiving element 202, ensures that the image of the light-emitting spot of light-emitting element 201 projected onto a plane comprising light-receiving surface 402 of light-receiving element 202 does not overlap with light-receiving surface 402.

Fiber guide 305 used for positioning optical fiber 200 is provided in optical waveguide substrate 101. Transmitting optical waveguide 301, receiving optical waveguide 302, and transceiving optical waveguide 303 intersect in one point, with slit 304 provided at the point of intersection. Slit 304, which reaches all the way to the core of the optical waveguide in depth, is formed at a predetermined angle to transceiving optical waveguide 303. Optical filter 203 is inserted into slit 304 and the slit is filled with resin transparent to transmitted optical signals 501 and received optical signals 502 and having a refractive index close to the effective refractive index of the optical waveguides while making sure that no gas bubbles are formed.

Transmitting optical waveguide 301 and transceiving optical waveguide 303 are parallel to each other, with their centers formed so as to be shifted by an amount calculated using Snell's law from the difference in the refractive indices of the resin filling slit 304, optical filter 203, and the optical waveguide, and receiving optical waveguide 302 is formed symmetrically with respect to transceiving optical waveguide 303 about a normal line drawn to the light entrance surface of optical filter 203. Receiving optical waveguide end face 307 located on the side of receiving optical waveguide 302 opposed to optical filter 203 is a smooth face formed, for instance, by dicing.

Light-emitting element 201 is arranged by adjusting its position, height, and angle in such a manner that transmitted optical signals 501 are coupled to transmitting optical waveguide 301.

Optical path converter 306 is formed in a location where received optical signals 502 emitted from receiving optical waveguide 302 are incident on reflecting surface 400 of optical path converter 306 and reflecting surface 400 is formed to be of sufficient size for the spot size of received optical signals 502.

Light-receiving element 202 is arranged in a location where the optical axis of light-emitting element 201 and the normal to light-receiving surface 402 of light-receiving element 202 are not in the same plane, i.e. in a location where they are in a spatially divergent relationship, with light-receiving surface 402 facing downwardly such that received optical signals 502 reflected by optical path converter 306 are incident on light-receiving surface 402.

Figure 5:
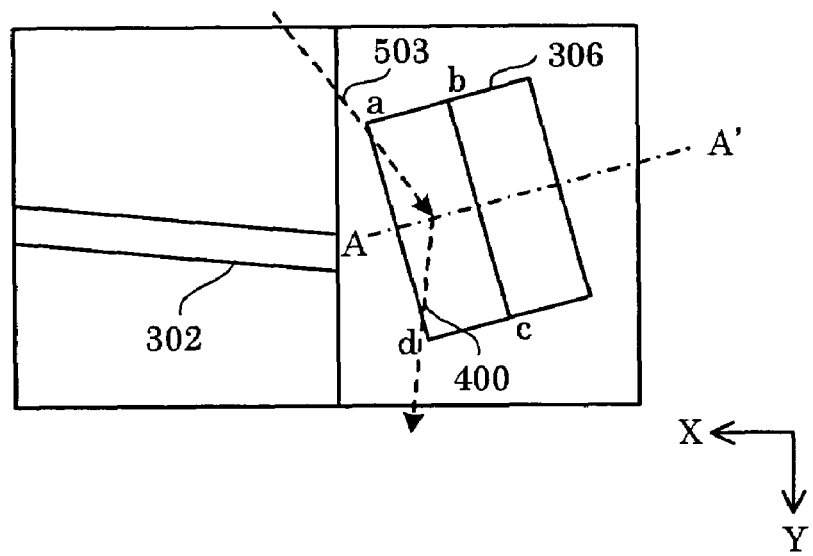
FIG. 5 is a diagram illustrating the relationship between an optical path converter and stray light in plan view.
Figure 6:
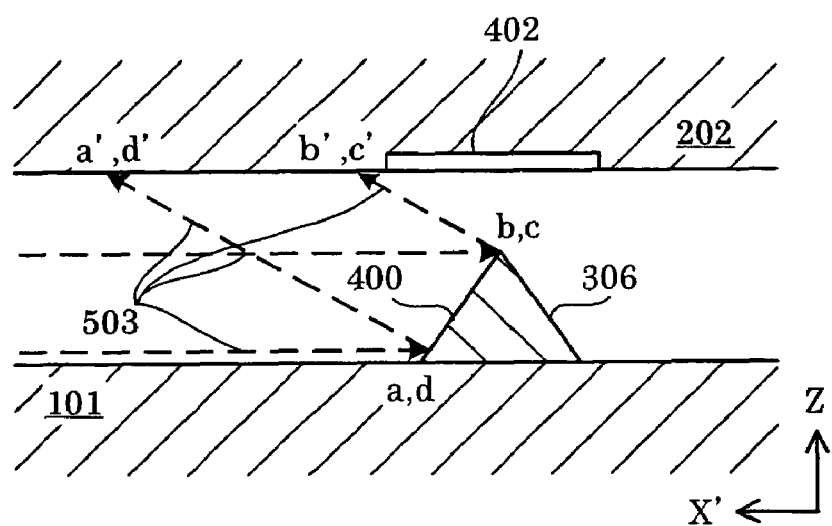
FIG. 6 is a diagram explaining the reflection of stray light in a cross-section taken along A-A' in FIG. 5.

Next, optical path converter 306 is explained in detail by referring to drawings. FIG. 5 shows the relationship between optical path converter 306 and stray light 503 in plan view and FIG. 6 explains the reflection of stray light in a cross-section along A-A' in FIG. 5.

The portion of light emitted from light-emitting spot 401 of light-emitting element 201 that is not coupled to transmitting optical waveguide 301 reaches arbitrary points on optical path converter 306 as stray light 503. Stray light 503 undergoes optical path conversion symmetrically about the normal to reflecting surface 400 of optical path converter 306, with angular points a, b, c, and d on reflecting surface 400 projected onto points a', b', c', and d' on light-receiving element 202. At such time, the inclination, orientation, and size of reflecting surface 400 of optical path converter 306 are set so as to prevent the projected image of reflecting surface 400 from overlapping with light-receiving surface 402.

Although in this embodiment optical waveguide substrate 101 preferably has superior processability and thermal conductivity, such as, for instance, a silicon wafer, other materials, e.g. glass substrates, polymer substrates, and ceramic substrates, can be used as well.

Transmitting optical waveguide 301, receiving optical waveguide 302, and transceiving optical waveguide 303 are formed of materials transparent to transmitted optical signals and received optical signals, such as, for instance, quartz or polymers.

The angle, at which slit 304 is arranged with respect to transceiving optical waveguide 303, is preferably not more than 45°. Setting the angle between slit 304 and transceiving optical waveguide 303 to not more than 45°contributes to higher productivity because a surface inclined with respect to the direction of emission can be formed by machining in parallel with the edge of optical waveguide substrate 101 when forming end face 307 of receiving optical waveguide 302 by dicing.

As for optical path converter 306, e.g. a ball-shaped piece of gold can be formed in advance on optical waveguide substrate 101 and shaped into a trigonal prismatic form by applying pressure with a Λ-shaped die, with reflection from its inclined surfaces used as optical path converter 306. In addition, metal can be formed by plating etc. in a Λ-shaped mold and then transferred to optical waveguide substrate 101. The material of optical path converter 306 is not limited to gold and may be any material possessing high reflectance with respect to received optical signals 502.

The top faces of transmitting optical waveguide 301, receiving optical waveguide 302 and transceiving optical waveguide 303 are preferably coated with resin that is black at the wavelength of transmitted optical signals 501 and at the wavelength of received optical signals 502. The reason for this is to prevent stray light generated by light-emitting element 201 from directly reaching the light-receiving surface of light-receiving element 202.

Light-emitting element 201 and light-receiving element 202, respectively, are preferably encapsulated with resin transparent to the wavelength of transmitted optical signals 501 and to the wavelength of received optical signals 502, and having a refractive index similar to that of the optical waveguides, and, on top of the transparent resin, sealed with resin that has a low moisture permeability coefficient and is black at the wavelength of transmitted optical signals 501 and at the wavelength of received optical signals 502. The reason for this is to enable simplification of packages comprising the module by encapsulating light-emitting element 201 and light-receiving element 202 with resin having a low coefficient of moisture permeability and to be able to absorb stray light 503 from light-emitting element 201.

The operation of the optical module is explained next.

A received optical signal 502 coming in from optical fiber 200 propagates along transceiving optical waveguide 303, is reflected by optical filter 203, and coupled to receiving optical waveguide 302. Light emitted from receiving optical waveguide 302 is totally reflected by optical path converter 306, received by light-receiving element 202, and converted into an electrical signal. On the other hand, a transmitted signal is converted to an optical signal in light-emitting element 201 and coupled to transmitting optical waveguide 301. Transmitted optical signal 501 passes through optical filter 203, propagates along transceiving optical waveguide 303 and is emitted from optical fiber 200.

A portion of stray light 503 formed when the optical signal produced by conversion in light-emitting element 201 does not couple to transmitting optical waveguide 301 is radiated into space and into the direction of light-receiving element 202 as well. However, because the top faces of light-emitting element 201, light-receiving element 202, and transmitting optical waveguide 301, as well as the top face of receiving optical waveguide 302 are coated with black resin and, furthermore, because the optical axis of light-emitting element 201 and the normal to light-receiving surface 402 of light-receiving element 202 are in a divergent relationship, stray light coupled to light-receiving element 202 is sufficiently low.

In addition, a portion of stray light 503 oriented in the direction of light-receiving element 202 reaches optical path converter 306, undergoes light path conversion by optical path converter 306, and forms a projected image on the plane comprising the light-receiving surface of light-receiving element 202. At such time, the projected image does not overlap with light-receiving surface 402 of light-receiving element 202 and stray light 503 does not get coupled to light-receiving element 202.

When emitted from receiving optical waveguide 302, a portion of received optical signals 502 is reflected by the end face. The reflected light can be prevented from going back into receiving optical waveguide 302 by forming the end portion obliquely to the direction of light emission. In addition, deflecting the angle, at which light from optical path converter 306 is incident on light-receiving surface 402 of light-receiving element 202, from the normal to light-receiving surface 402 makes it possible to prevent light reflected without coupling to light-receiving element 202 from coupling to receiving optical waveguide 302 by way of optical path converter 306.

In this manner, this embodiment makes it possible to prevent light from the light-emitting element of the local station from impinging on the light-receiving element, as well as to prevent received optical signals from going back into the transmission line again.

Figure 7:
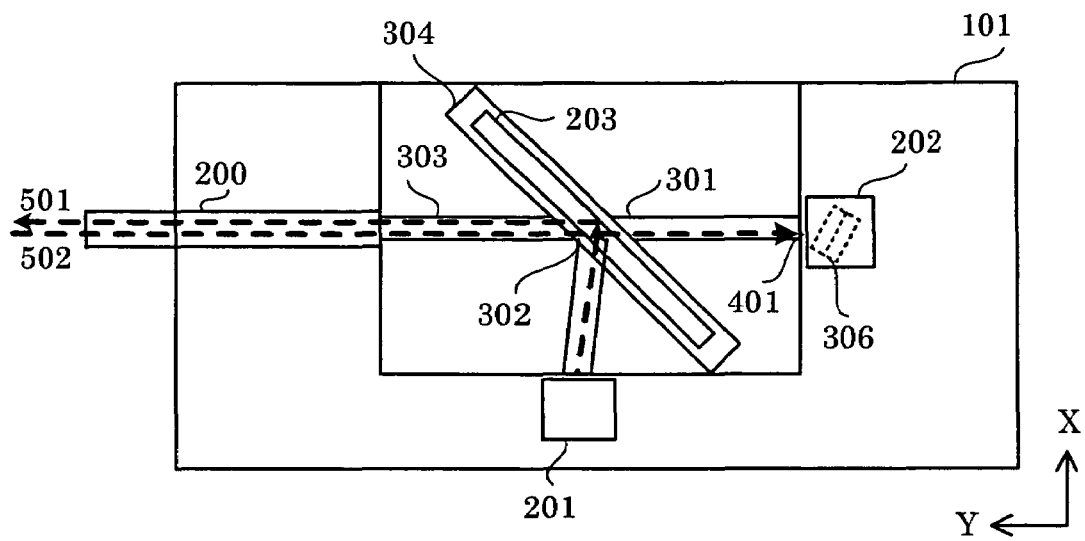
FIG. 7 is a plan view illustrating the configuration of an optical module used in a second embodiment of the present invention.

FIG. 7 is a plan view illustrating the configuration of the optical module used in a second embodiment of the present invention. In this embodiment, optical path converter 306 and light-receiving element 202 are arranged in the portion where light-emitting element 201 was arranged in the first embodiment and light-emitting element 201 is arranged in the portion where light-receiving element 202 was arranged in the first embodiment. The relationship between optical path converter 306 and stray light 503 emitted from light-emitting element 201 is identical to that of the first embodiment. The present invention permits changes to the positional relationship of light-emitting element 201 and light-receiving element 202 in the manner described in this embodiment and is not confined to the positional relationship of the respective elements.

Figure 8:
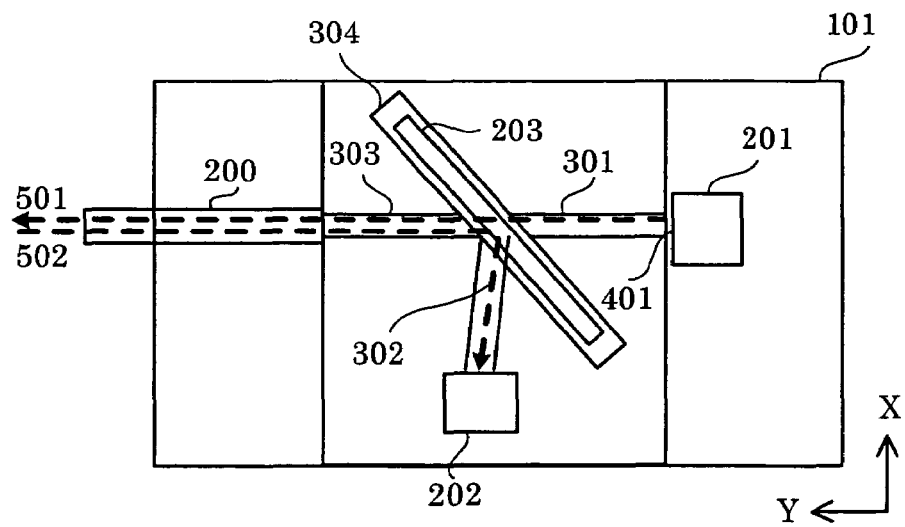
FIG. 8 is a plan view explaining the configuration of an optical module used in a third embodiment of the present invention.
Figure 9:
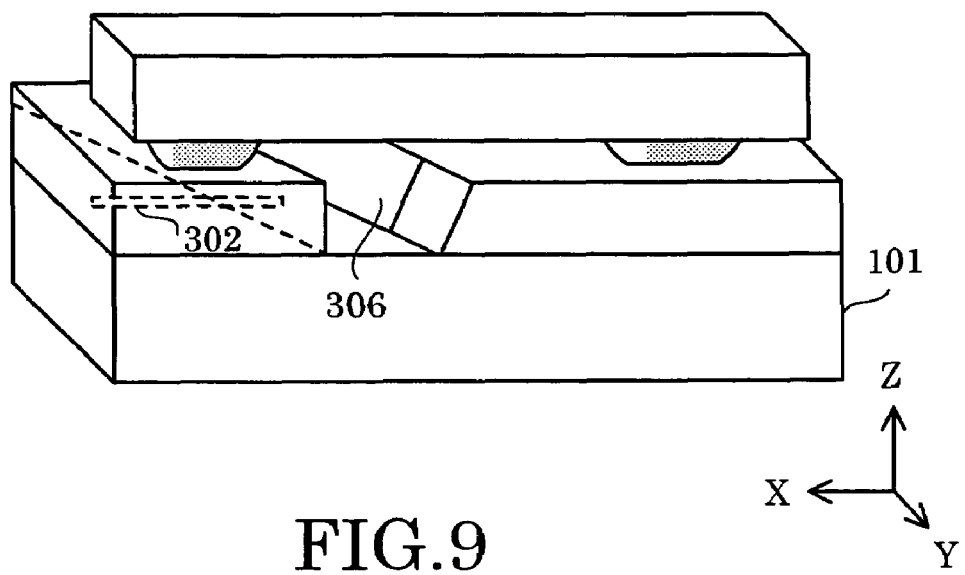
FIG. 9 is an enlarged perspective view of the optical path converter and its periphery.
Figure 10:
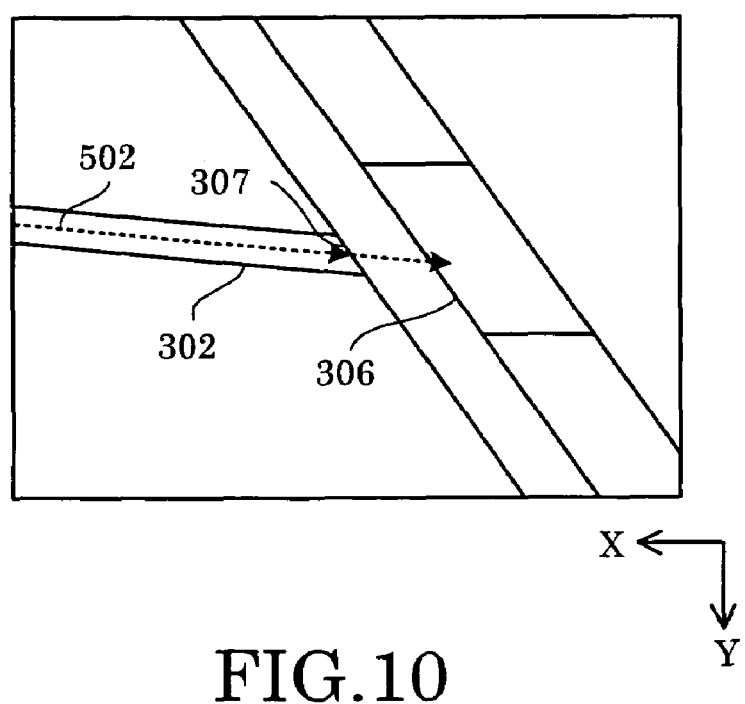
FIG. 10 is an enlarged plan view of the optical path converter and its periphery without the light-receiving element.

FIG. 8 is a plan view explaining the configuration of the optical module used in a third embodiment of the present invention, FIG. 9 is an enlarged perspective view of optical path converter 306 and its periphery, and FIG. 10 is an enlarged plan view of optical path converter 306 and its periphery without light-receiving element 202. In this embodiment, a groove is formed in a portion of receiving optical waveguide 302 and the surface facing end face 307 of receiving optical waveguide 302 is machined into an inclined surface. A material of superior reflectance, e.g. gold, is deposited over a portion or all of the inclined surface in order to use its reflection as optical path converter 306. At such time gold is preferable as the metal deposited on the inclined surface. The reason for this is the ability to simultaneously form the electrical wiring of light-receiving element 202 and light-emitting element 201.

Figure 11:
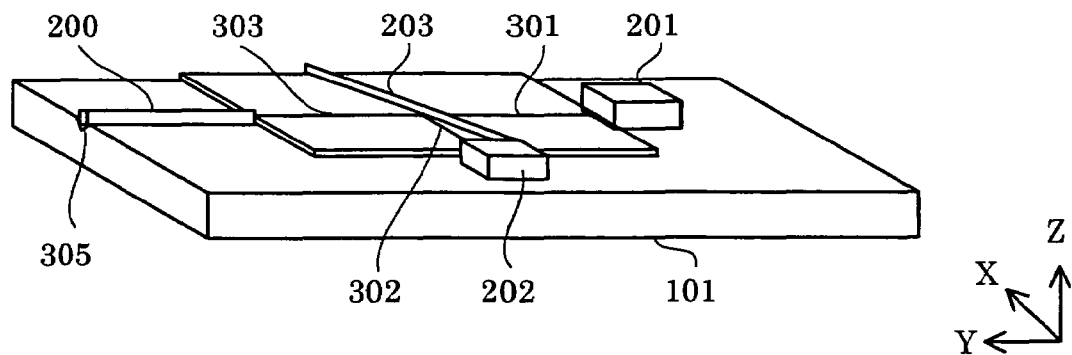
FIG. 11 is a perspective view illustrating the configuration of an optical module used in a fourth embodiment of the present invention.
Figure 12:
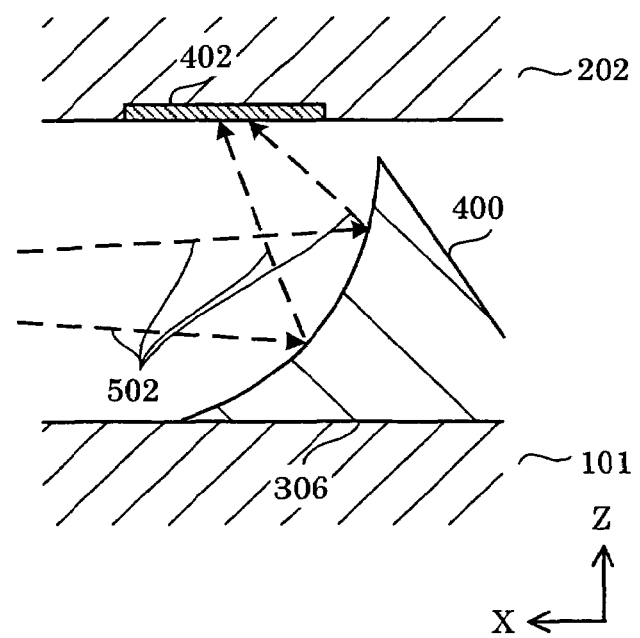
FIG. 12 is a cross-sectional view of the periphery of the optical path converter.

FIG. 11 is a perspective view illustrating the configuration of the optical module used in a fourth embodiment of the present invention and FIG. 12 is a cross-sectional view of the periphery of optical path converter 306 in the XZ plane. Although this embodiment makes use of gold formed into a trigonal prismatic shape as optical path converter 306 in the same manner as in the first embodiment, it differs from the first embodiment in that reflecting surface 400 is in the form of a hyperbolic curve. It is equivalent to the first embodiment with the exception of the shape of optical path converter 306.

This embodiment makes it possible to reduce the spot size of received optical signals 502 on light-receiving surface 402 of light-receiving element 202 and to reduce light-receiving surface 402 of light-receiving element 202. This reduces the noise of light-receiving element 202 and, furthermore, permits a speed increase, which makes it possible to increase the speed of the optical module.

Figure 13:
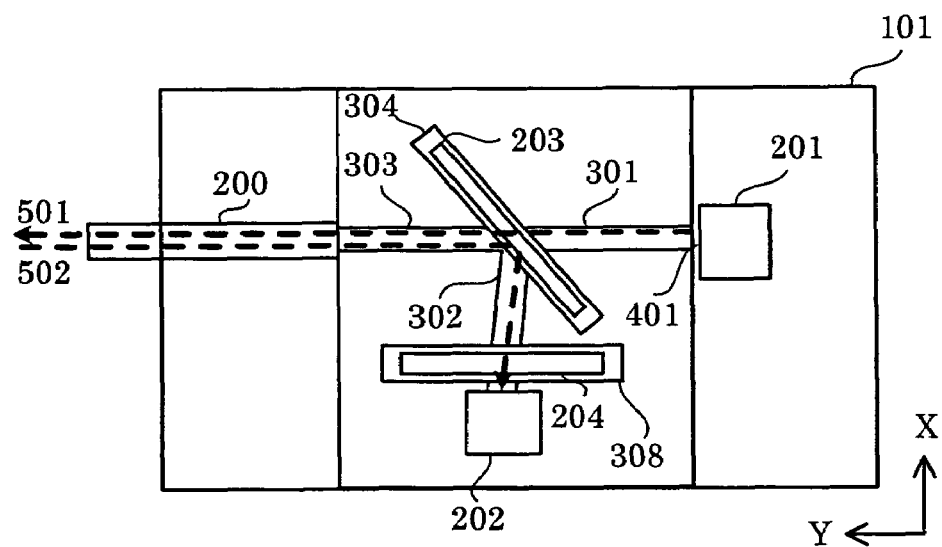
FIG. 13 is a plan view illustrating the configuration of an optical module used in a fifth embodiment of the present invention.

FIG. 13 is a plan view illustrating the configuration of the optical module used in a fifth embodiment of the present invention. This embodiment differs from the first embodiment in that second slit 308 and second optical filter 204 are provided within receiving optical waveguide 302. Second optical filter 204 is designed to transmit light having the wavelength of received optical signals 502 and reflect light of other wavelengths.

In this embodiment, second optical filter 204 makes it possible to block the reflection of transmitted optical signals 501 from the distal end as well as the portion of the light with wavelengths other than that of received optical signals 502 coming in from the transmission line that leaks into receiving optical waveguide 302. This makes it possible to greatly reduce the noise incident on light-receiving element 202 and, furthermore, permits introduction of optical signals of other wavelengths into the same network.

In this embodiment, desirably, second slit 308 and second optical filter 204 are arranged obliquely to receiving optical waveguide 302. The reason for this is that light reflected by second optical filter 204 is not coupled to receiving optical waveguide 302 and reflection losses can be reduced.

Figure 14:
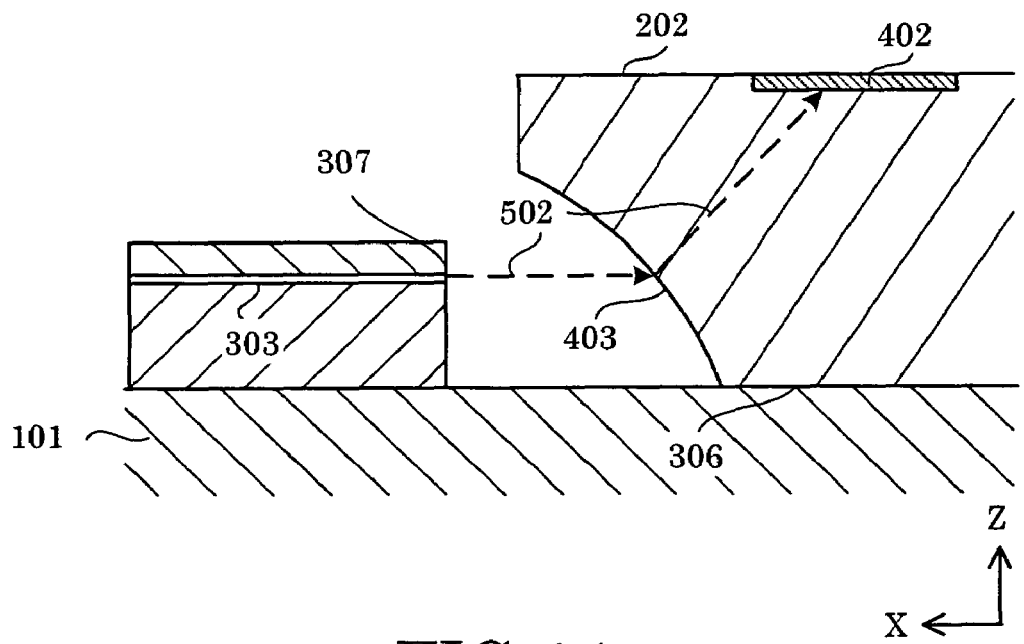
FIG. 14 is a cross-sectional view illustrating the configuration of an optical module used in a sixth embodiment of the present invention.

FIG. 14, which is a cross-sectional view illustrating the configuration of the optical module used in a sixth embodiment of the present invention, shows a cross-section of the periphery of the optical path conversion means in the XZ plane. This embodiment utilizes light refraction due to differences in the refractive indices of materials as the optical path conversion means, with the optical path conversion means formed integrally with light-receiving element 202. Otherwise, it is equivalent to the first embodiment.

Light-receiving element 202 is obtained by growing a GaInP or another compound semiconductor crystal on an InP or GaAs substrate and has a refractive index higher than those of air, quartz, and resins. For this reason, when received optical signal 502 emitted from end face 307 of receiving optical waveguide 302 is incident on light-receiving element 202, in accordance with Snell's law, it undergoes considerable refraction at entrance surface 403 of the light-receiving element, propagates through light-receiving element 202 and couples to light-receiving surface 402.

This embodiment does not require light-receiving element 202 and optical path conversion means to be arranged separately and permits an increase in productivity.

Figure 15:
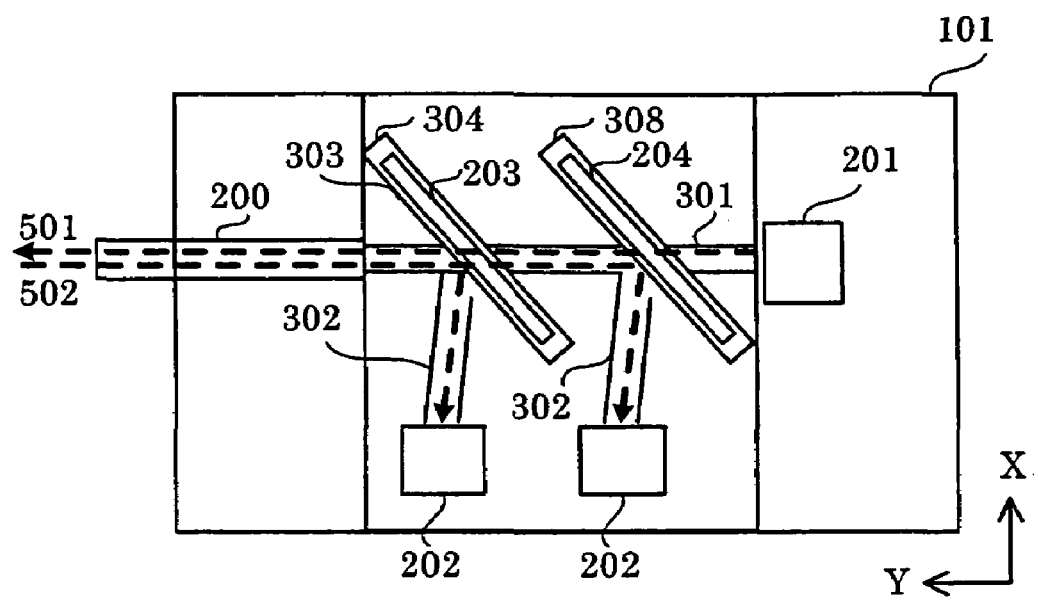
FIG. 15 is a plan view illustrating the configuration of an optical module used in a seventh embodiment of the present invention.
Figure 16:
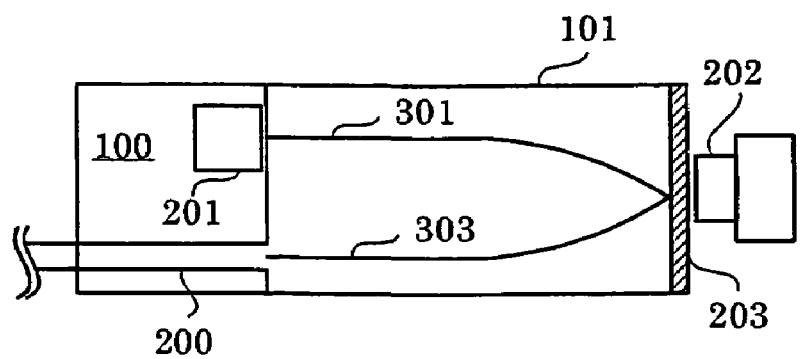
FIG. 16 is a diagram explaining the configuration of a conventional bidirectional optical module.
Figure 17:
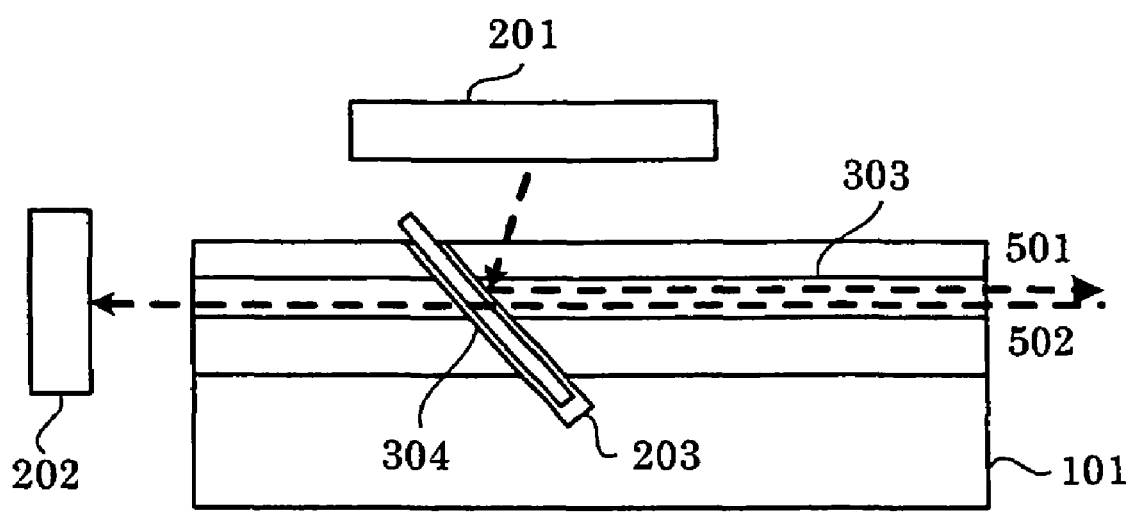
FIG. 17 is a diagram explaining the configuration of another conventional example.

FIG. 15 is a plan view illustrating the configuration of the optical module used in a seventh embodiment of the present invention. In this embodiment, received optical signals 502 have two different multiplexed wavelengths. Therefore, after a first optical signal is separated using optical filter 203, a second optical signal is derived using second optical filter 204. Optical filters 203 and 204 are respectively provided with receiving optical waveguide 302, optical path conversion means, and light-receiving element 202 identical to those of the first embodiment. The number of wavelengths in received optical signals 502 is not limited to two and the present invention can be worked in the same manner in cases, wherein there are even more multiplexed wavelengths.

This embodiment can be adapted to an optical module providing a plurality of services over a single optical fiber.

What is claimed is:

1. An optical module comprising, on the same optical waveguide substrate:

a light-emitting element;

a first optical waveguide optically coupled to the light-emitting element;

a light-receiving element; and a second optical waveguide guiding optical signals to the light-receiving element, wherein the light-receiving element is arranged in a position where an optical axis of the light-emitting element and a normal to a light-receiving surface of the light-receiving element are not in a same plane, and comprises optical path conversion means that guides optical signals propagating along the second optical waveguide to the light-receiving surface of the light-receiving element, and ensures that an image of the light-emitting spot of the light-emitting element projected onto a plane comprising the light-receiving surface of the light-receiving element does not overlap with light-receiving surface of the light-receiving element.

2. The optical module according to claim 1, wherein the optical path conversion means comprises a planar reflector.

3. The optical module according to claim 1, wherein the optical path conversion means comprises a concave reflector.

4. The optical module according to claim 1, wherein the optical path conversion means comprises means for performing optical path conversion using differences in the refractive indices of materials.

5. The optical module according to claim 4, wherein the means for performing optical path conversion is formed integrally with the light-receiving element.

6. The optical module according to claim 1, wherein a slit is arranged having an angle of not more than 45° with respect to the first optical waveguide.

7. An optical module, comprising:

on the same optical waveguide substrate, a light-emitting element, a first optical waveguide optically coupled to the light-emitting element, a light-receiving element, and a second optical waveguide guiding optical signals to the light-receiving element, wherein the light-receiving element is arranged in a position where an optical axis of the light-emitting element and a normal to a light-receiving surface of the light-receiving element are not in a same plane, and comprises optical path conversion means that guides optical signals propagating along the second optical waveguide to the light-receiving surface of the light-receiving element, and ensures that an image of the light-emitting spot of the light-emitting element projected onto a plane comprising the light-receiving surface of the light-receiving element does not overlap with light-receiving surface of the light-receiving element, and on the optical waveguide substrate, a third optical waveguide having an optical fiber optically coupled thereto and optical multiplexing/de-multiplexing means that outputs transmitted optical signals from the first optical waveguide to the third optical waveguide and guides received optical signals from the third optical waveguide to the second optical waveguide.

8. The optical module according to claim 7, wherein the optical multiplexing/de-multiplexing means includes a slit formed in the optical waveguide substrate and an optical filter that is inserted in the slit, couples transmitted optical signals from the first optical waveguide to the third optical waveguide by passing or reflecting the transmitted optical signals, and couples received optical signals from the third optical waveguide to the second optical waveguide by reflecting or passing the received optical signals.

9. The optical module according to claim 7, wherein the optical path conversion means comprises a planar reflector.

10. The optical module according to claim 7, wherein the optical path conversion means comprises a concave reflector.

11. The optical module according to claim 7, wherein the optical path conversion means comprises means for performing optical path conversion using differences in the refractive indices of materials.

12. The optical module according to claim 11, wherein the means for performing optical path conversion is formed integrally with the light-receiving element.

13. An optical module comprising, on the same optical waveguide substrate:

a light-emitting element;

a first optical waveguide optically coupled to the light-emitting element;

a light-receiving element; and a second optical waveguide guiding optical signals to the light-receiving element, wherein the light-receiving element is arranged in a position where an optical axis of the light-emitting element and a normal to a light-receiving surface of the light-receiving element are not in a same plane, and comprises an optical path conversion device that guides optical signals propagating along the second optical waveguide to the light-receiving surface of the light-receiving element, and ensures that an image of the light-emitting spot of the light-emitting element projected onto a plane comprising the light-receiving surface of the light-receiving element does not overlap with light-receiving surface of the light-receiving element.

14. The optical module according to claim 13, wherein the optical path conversion device comprises a planar reflector.

15. The optical module according to claim 13, wherein the optical path conversion device comprises a concave reflector.

16. The optical module according to claim 13, wherein the optical path conversion device comprises an apparatus for performing optical path conversion using differences in the refractive indices of materials.

17. The optical module according to claim 16, wherein the apparatus for performing optical path conversion is formed integrally with the light-receiving element.

* * * * *